United States Patent
Hisai

(10) Patent No.: US 6,653,013 B2
(45) Date of Patent: Nov. 25, 2003

(54) CURRENT COLLECTING LUGS IN A CYLINDRICAL BATTERY

(75) Inventor: Makoto Hisai, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 202 days.

(21) Appl. No.: 09/985,070

(22) Filed: Nov. 1, 2001

(65) Prior Publication Data
US 2002/0061435 A1 May 23, 2002

(30) Foreign Application Priority Data
Nov. 17, 2000 (JP) ..................... P.2000-351685

(51) Int. Cl.[7] .............. H01M 2/26; H01M 2/20
(52) U.S. Cl. .......... 429/94; 429/211; 429/225; 429/233; 429/241; 429/242
(58) Field of Search ............ 429/94, 211, 225, 429/233, 241, 242

(56) References Cited

U.S. PATENT DOCUMENTS

2001/0004503 A1    6/2001   Kondo

FOREIGN PATENT DOCUMENTS

| JP | 10-340737 A | 12/1998 | | |
|---|---|---|---|---|
| JP | 10-340738 A | 12/1998 | | |
| JP | 11-86833 A | 3/1999 | | |
| JP | 2001-143712 A | 5/2001 | | |
| JP | 2001-143712 | * 5/2001 | ............ | H01M/4/78 |
| JP | 2001-160384 A | 6/2001 | | |
| JP | 2001-160386 A | 6/2001 | | |

* cited by examiner

Primary Examiner—Patrick Ryan
Assistant Examiner—Angela J. Martin
(74) Attorney, Agent, or Firm—Sughrue Mion, PLLC

(57) ABSTRACT

A battery comprising an electricity-generating element comprising a strip-form positive electrode, a strip-form negative electrode, and a strip-form separator, said positive electrode and said negative electrode being spirally wound through said separator and said positive electrode and said negative electrode respectively having current collecting lugs protruding from a side thereof, wherein the pitches of the current collecting lugs become longer toward the outer periphery side, and the at least one current collecting lug that located on the outer side has a larger width than that located on the inner side. In this battery, the electricity-generating element has at least one current collecting lug which has a larger width than the adjacent current collecting lug located on the inner side thereof. Consequently, although the current collecting lugs in an outer region are located at a longer pitch and the area to be covered by each current collecting lug in that region is wide, charge/discharge current can sufficiently flow through the active material throughout the whole area in that region. Therefore, charge/discharge current can evenly flow through the electrodes including their inner and outer parts, whereby the active materials can have an even reaction distribution.

3 Claims, 7 Drawing Sheets

CURRENT COLLECTING LUGS IN A CYLINDRICAL BATTERY

FIELD OF THE INVENTION

The present invention relates to a battery.

BACKGROUND OF THE INVENTION

A cylindrical lead acid battery is fabricated, for example, by spirally winding a strip-form positive electrode 21 and negative electrode 22 through a strip-form separator 23 to form a cylindrical electricity-generating element 24 as shown in FIG. 6, inserting this element 24 into a battery case (not shown), and sealing the case.

This electricity-generating element 24 formed by winding has current collecting lugs 21a and current collecting lugs 22a, which protrude on the upper side of the element 24 so as to be arranged on a straight line passing through the center of winding. The current collecting lugs 21a of the positive electrode 21 are arranged on one half of this straight line, i.e., on one side of the center of winding, while the current collecting lugs 22a of the negative electrode 22 are arranged on the other half. Namely, the current collecting lugs 21a and 22a are arranged in such a manner that the current collecting lugs located on one side of the center of winding differ in polarity from those located on the other side. The current collecting lugs 21a of the positive electrode 21 are connected to a positive terminal through a positive-electrode strap (not shown) disposed to cover the current collecting lugs 21a. On the other hand, the current collecting lugs 22a of the negative electrode 22 are connected to a negative terminal through a negative-electrode strap (not shown).

The reasons why the current collecting lugs 21a and 22a are arranged on a straight line are explained below with respect to the current collecting lugs 21a of the positive electrode 21. With respect to the current collecting lugs 22a of the negative electrode 22, an explanation is omitted because the same explanation applies thereto.

In the case where the current collecting lugs 21a are arranged on a straight line as in FIG. 6, a linear strap can be used for connecting the current collecting lugs 21a thereto. However, if the current collecting lugs 21a are not arranged on a straight line, the strap should have a shape corresponding to the arrangement of the current collecting lugs and be larger than the linear one. Use of such a large positive-electrode strap is disadvantageous in that not only there is the possibility of contact with a negative-electrode strap but also the battery has an increased mass (weight) because the strap is made of, e.g., a lead alloy and is hence heavy. For these reasons, the current collecting lugs 21a are arranged on a straight line passing through the center of winding.

In order for the current collecting lugs 21a to be arranged on a straight line passing through the center of winding, the positive electrode 21 should have such a structure that the length over which the positive electrode 21 is spirally wound together with a separator 23 and a negative electrode 22 from one current collecting lug 21a to the next current collecting lug 21a to make one turn increases toward the outer side. This structure is further explained by reference to FIG. 7, which illustrates a grid 21b for the positive electrode 21 which has not been filled with an active material. This strip-form grid 21b, which has current collecting lugs 21a protruding on one of the longer sides, is located so that the distance D between two adjacent current collecting lugs 21a becomes longer toward the outer side. This distance D is determined, for example, in the following manner. The distance D between a current collecting lug 21a and the next current collecting lug 21a located on the outer side thereof is a value approximately satisfying the relationship $$D = 2\pi r$$

wherein r is the distance between the former current collecting lug 21a and the center of winding. As a result, all the current collecting lugs 21a are arranged on a straight line passing through the center of winding.

In conventional positive electrodes 21, the current collecting lugs 21a have the same shape regardless of whether they are located in an inner region of the coil or in an outer region thereof. We found that the conventional positive electrodes have a problem that electricity-generating element 24 as a whole has an uneven distribution of the reaction of each active material. This problem is explained in more detail with respect to the case where charge/discharge current flows through a positive electrode 21 via current collecting lugs 21a. In an inner region of the coil, the area in which electricity should be collected by one current collecting lug 21a is smaller than in an outer region since the distance D between adjacent two of the current collecting lugs 21a in the inner region is small. Because of this, sufficient charge/discharge current can flow through the active material in the whole area via the current collecting lug 21a.

In contrast, in an outer region of the coil, the area in which electricity should be collected by one current collecting lug 21a is large since the distance D between adjacent two of the current collecting lugs 21a in the outer region is large. Accordingly, sufficient charge/discharge current cannot flow through the active material in the whole area in this region via the current collecting lug 21a, which is the same shape as those in the inner region. In the outer region, the part of the active material which is located near the current collecting lugs 21a is preferentially used, and that part of the active material which is located apart from the current collecting lugs 21a remains unused. There is hence the possibility of a decrease in battery performance.

This problem applies not only to the positive electrode 21 but to the negative electrode 22 employing the grid 22b shown in FIG. 8, which has current collecting lugs 22a protruding therefrom.

Under the circumstances described above, an object of the invention is to provide a battery in which the electricity-generating element as a whole can have an even distribution of the reaction of each active material.

SUMMARY OF THE INVENTION

The invention provides a battery comprising an electricity-generating element comprising a strip-form positive electrode, a strip-form negative electrode, and a strip-form separator, said positive electrode and said negative electrode being spirally wound through said separator and said positive electrode and said negative electrode respectively having current collecting lugs protruding from a side thereof, wherein the pitches of the current collecting lugs become longer toward the outer periphery side, and the at least one current collecting lug that located on the outer side has a larger width than that located on the inner side.

In this battery, the electricity-generating element has a current collecting lug has a larger width than the adjacent current collecting lug located on the inner side thereof. Consequently, although the current collecting lugs in an outer region are located at a long pitch and the area to be covered by each current collecting lug in that region is wide, the charge/discharge current can sufficiently flow through the active material throughout the whole each area in that region. Therefore, the charge/discharge current can evenly flow through the electrode plates including their inner and outer parts, whereby the active materials can have an even reaction distribution.

The current collecting lugs of the positive electrode and those of the negative electrode are preferably arranged on the same line.

This linear arrangement is advantageous in that the strap to be connected to the current collecting lugs of the positive electrode or to the current collecting lugs of the negative electrode can have a linear shape and hence have a minimum size and mass (weight).

Furthermore, each current collecting lug preferably has a width L approximately satisfying the relationship L=r×θ, wherein r is the distance between the current collecting lug and the center of winding and θ is a constant of central angle.

According to this constitution, although each of the current collecting lugs located in an outer region should cover a larger area, the width thereof L becomes larger without fail in proportion to the value of r, i.e., toward to the outer periphery side. Consequently, the charge/discharge current can be caused to flow evenly through the electrode plates including their inner and outer parts without fail, whereby the active materials can have an even reaction distribution.

The central angel θ is desirably a π/6 radian or larger from the standpoint that even the innermost current collecting lug has a sufficient width, and is desirably a π/3 radian or smaller from the standpoint of preventing the straps from having a too large mass (weight) due to the too large widths of the current collecting lugs.

DETAILED DESCRIPTION OF THE INVENTION

Figure 1:
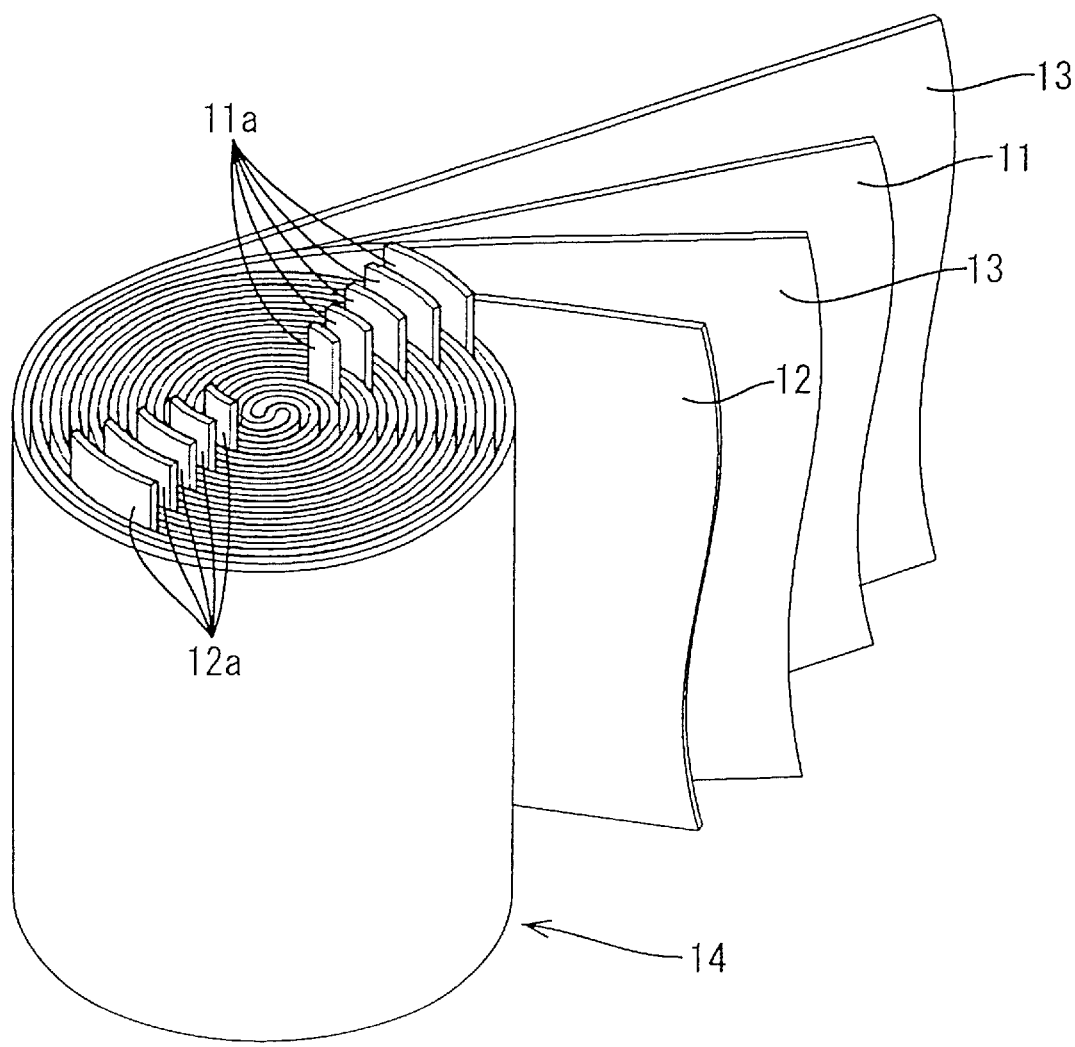
FIG. 1 is a slant view illustrating the electricity-generating element of a cylindrical lead acid battery as one embodiment of the invention.

A cylindrical lead acid battery as one embodiment of the invention will be explained below by reference to the drawings. The electricity-generating element 14 of this lead acid battery is a cylindrical structure formed by spirally winding a strip-form positive electrode 11 and a strip-form negative electrode 12 through a strip-form separator 13. As shown in FIG. 1, this electricity-generating element 14 formed by winding has current collecting lugs 11a and 12a protruding from the upper side thereof so as to be arranged along a straight line passing through the center of winding. The current collecting lugs 11a of the positive electrode 11 are arranged on one half of this straight line, i.e., on one side of the center of winding, while the current collecting lugs 12a of the negative electrode 12 are arranged on the other half. Namely, the current collecting lugs 11a and 12a are arranged so that the current collecting lugs located on one side of the center of winding differ in polarity from those located on the other side.

Figure 3:
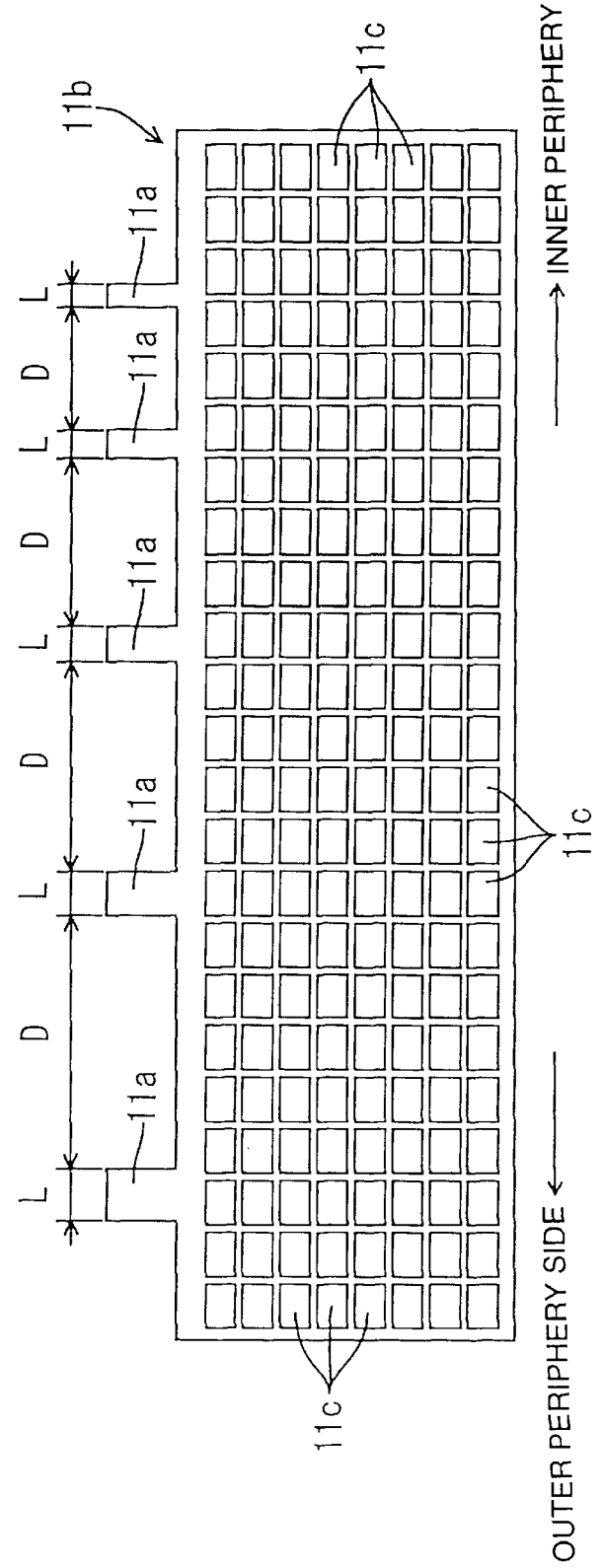
FIG. 3 is a plan view of a grid to be used as the positive electrode of the battery.
Figure 4:
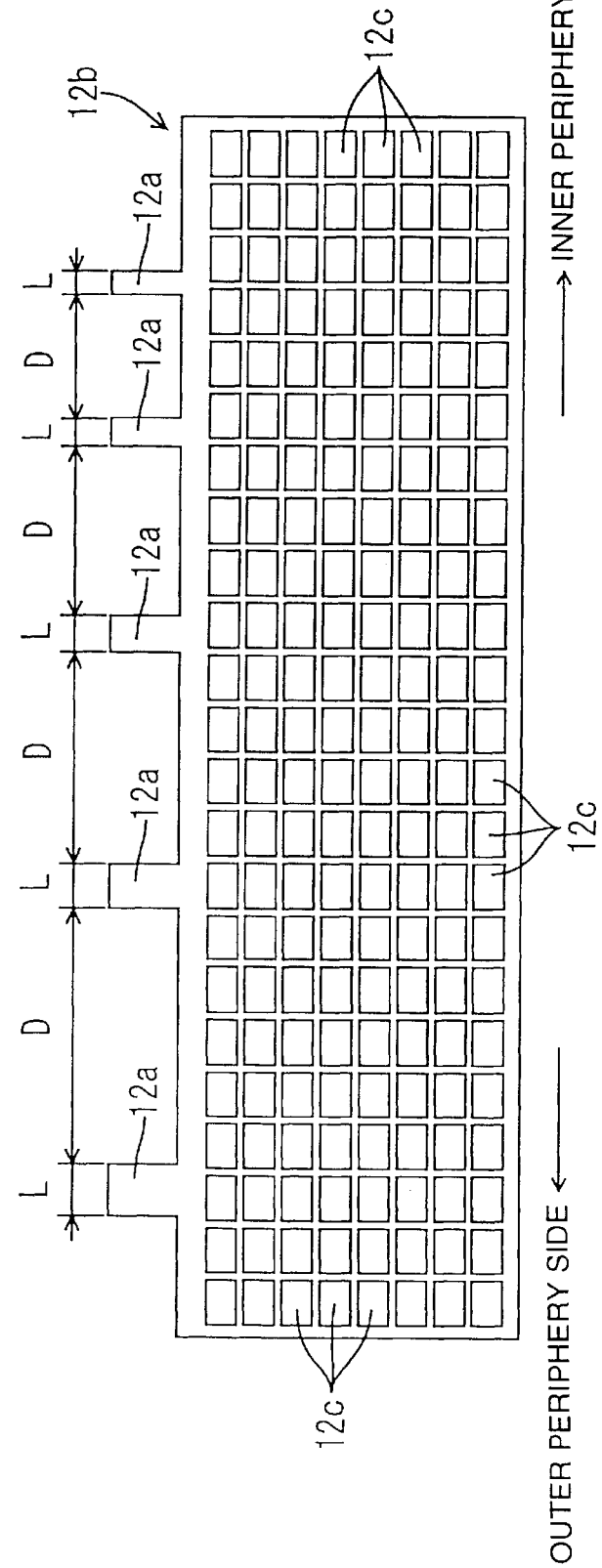
FIG. 4 is a plan view of a grid to be used as the negative electrode of the battery.

In order to form such an electricity-generating element in which the current collecting lugs 11a and 12a are arranged on a straight line passing through the center of winding, a positive electrode 11 and a negative electrode 12 employing the grids 11b and 12b, respectively, as shown in FIGS. 3 and 4, are used.

The grids 11b and 12b are obtained by forming many rectangular openings 11c and 12c in a strip-form lead sheet. Filling the openings 11c or 12c with an active material gives the positive electrode 11 or negative electrode 12.

The grids 11b and 12b have rectangular current collecting lugs 11a and 12a protruding from side portions thereof. These current collecting lugs 11b or 12b are formed by partly cutting a side part of the lead sheet. The distance D between adjacent two of the current collecting lugs 11a or 12a approximately satisfies the relationship $$D=2\pi r$$

according to the distance between the current collecting lug 11a or 12a and the center of winding. Namely, the distance D becomes longer toward the outer periphery side.

Figure 2:
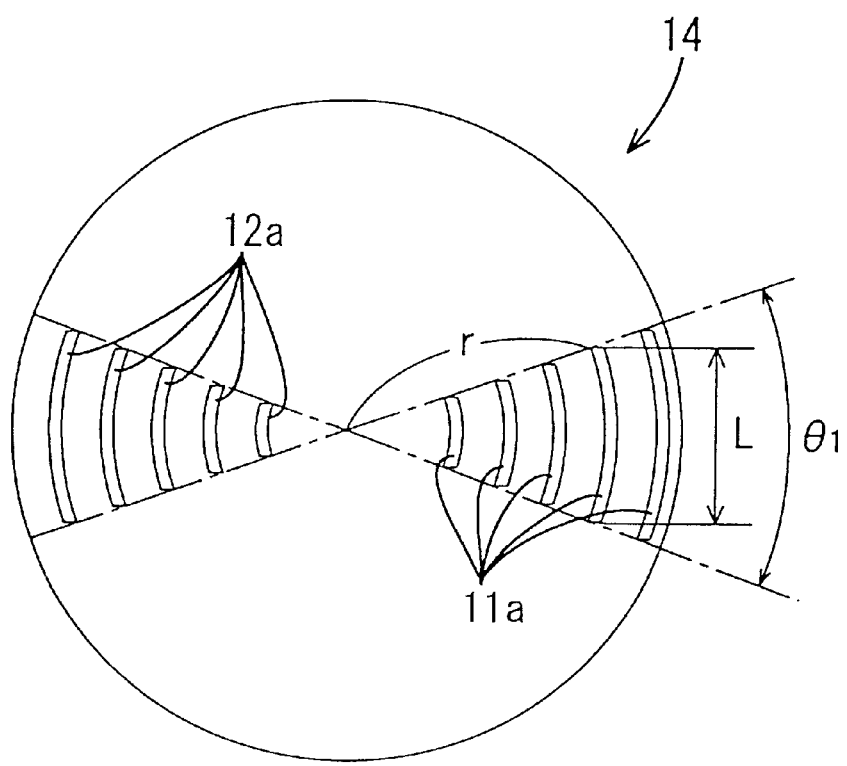
FIG. 2 is a plan view showing the widths of the current collecting lugs disposed on the upper side of the electricity-generating element.

The width of the current collecting lugs 11a or 12a of the positive electrode 11 or negative electrode 12 becomes larger toward the outer periphery side. Specifically, the current collecting lugs 11a and 12a are arranged so that the central angle θ corresponding to the arcs formed by the current collecting lugs 11a and 12a is an approximately constant value $\theta_1$ as shown in FIG. 2. This means that each of the current collecting lugs 11a and 12a has a width L approximately satisfying the relationship $$L=r\times\theta_1$$

wherein r is the distance between the current collecting lug 11a or 12a and the center of winding in the electricity-generating element 14. However, since too small a value of the central angle $\theta_1$ results in too small widths L of the innermost current collecting lugs 11a and 12a, the central angle $\theta_1$ is desirably a π/6 radian (30°) or larger. On the other hand, if the central angle $\theta_1$ is too large, the current collecting lugs 11a and 12a have too large widths L and, hence, the straps (not shown) which are disposed so as to cover them should have a considerably increased size and an increased mass (weight). Consequently, the central angle $\theta_1$ is desirably a π/3 radian (60°) or smaller.

As described above, the width of the current collecting lugs 11a and 12a becomes larger toward the outer periphery side.

In this embodiment having the constitution described above, the width L of the current collecting lugs 11a and 12a becomes larger toward the outer periphery of the coil. Consequently, although the distance D between adjacent current collecting lugs 11a or 12a becomes larger toward the outer periphery side and each current collecting lug 11a or 12a located in an outer region should cover a larger area, charge/discharge current can be caused to sufficiently flow through the active material in the whole area.

On the other hand, in an inner region, in which the distance D between adjacent current collecting lugs 11a or 12a is small, the current concentration in the electrode plates 11 and 12 does not occur because the widths L of the current collecting lugs 11a and 12a in this region are also small. Consequently, the distribution of the reaction of the active material in each of the electrode plates 11 and 12 is even.

In this embodiment, the current collecting lugs 11a and 12a protrude so as to be arranged on a straight line passing through the center of winding. This linear arrangement is advantageous in that the strap to be connected to the current collecting lugs of the positive electrode or to the current collecting lugs of the negative electrode can have a linear shape and hence have a minimum size and mass (weight).

Furthermore, in this embodiment, the width L of each of the current collecting lugs 11a and 12a satisfies $L=r\theta_1$. The positive electrode 11 and the negative electrode 12 have one current collecting lug 11a and one current collecting lug 12a, respectively, per turn, and the distance D between any two adjacent current collecting lugs 11a or 12a is approximately $2\pi r$ as stated above. Consequently, the proportion of the width L of each current collecting lug 11a or 12a to the distance D between this current collecting lug 11a or 12a and an adjacent one is constant, i.e., $\theta_1/(2\pi)$. Namely, in this embodiment of the battery of the invention, an optimal current flows evenly through the electrode plates 11 and 12, including their inner and outer parts. As a result, the whole electricity-generating element 14 can have an even distribution of the reaction of each active material.

The invention should not be construed as being limited to the embodiment described above by reference to accompanying drawings. For example, the following embodiments are included in the technical scope of the invention. Besides the following, various modifications can be made in practicing the invention unless these modifications depart from the spirit of the invention.

In the embodiment described above, the positive electrode 11 and the negative electrode 12 have one current collecting lug 11a and one current collecting lug 12a, respectively, per turn. It is, however, possible to use a positive and negative electrode each having one current collecting lug per given turns. It is also possible to use a positive electrode 11 or a negative electrode 12 each having two or more current collecting lugs 11a or 12a per turn. For example, use may be made of a positive electrode 11 and a negative electrode 12 respectively having two current collecting lugs 11a and two current collecting lugs 12a per turn so as to constitute an electricity-generating element 4 in which the protruding current collecting lugs 1a of the positive electrode 1 are arranged on the upper side of the element 4 along one of the two orthogonal diameters of the element 4 and the protruding current collecting lugs 2a of the negative electrode 2 are arranged along the other diameter.

The embodiments described above have a structure in which both the current collecting lugs 11a of the positive electrode 11 and the current collecting lugs 12a of the negative electrode 12 protrude from the upper side of the electricity-generating element 4. However, the battery of the invention is not limited to this structure. For example, the battery may have a constitution in which only the current collecting lugs 11a of the positive electrode 11 protrude from the upper side of the electricity-generating element 4 and only the current collecting lugs 12a of the negative electrode 12 protrude from the lower side thereof.

Furthermore, in the embodiments described above, cylindrical electricity-generating elements 4 for use in cylindrical lead acid batteries have been explained. However, the shape of the electricity-generating element 4 is not limited as long as the element 4 is one formed by winding. For example, it may be a slender cylinder or another shape, e.g., an ellipsoid. Moreover, besides being applicable to lead acid batteries, the invention is applicable, without particular limitations, to any kind of battery which employs an electricity-generating element formed by winding and has current collecting lugs for electricity collection.

Although the current collecting lugs 11a and 12a in the embodiments described above have a rectangular shape, the current collecting lugs according to the invention are not particularly limited in shape.

Figure 5:
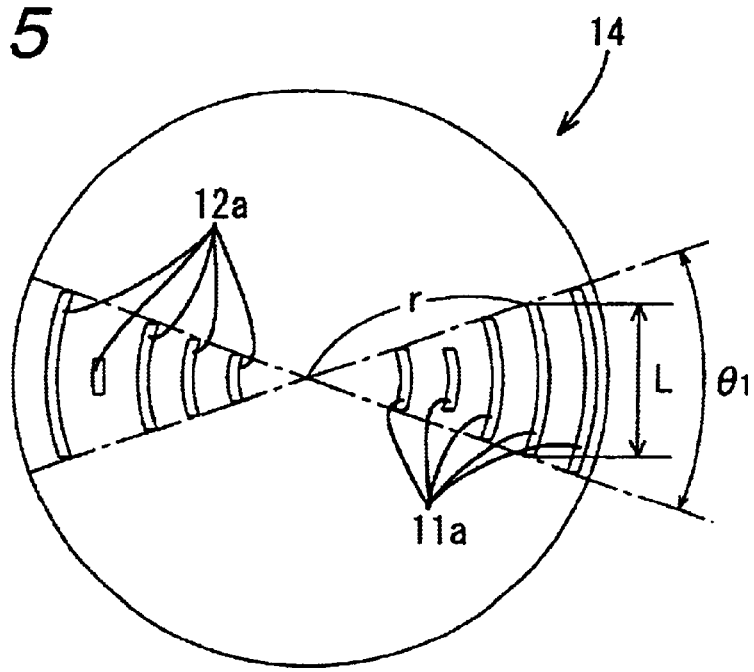
FIG. 5 is a plan view showing the widths of the current collecting lugs disposed on the upper side of the electricity-generating element of another embodiment of the invention.
Figure 6:
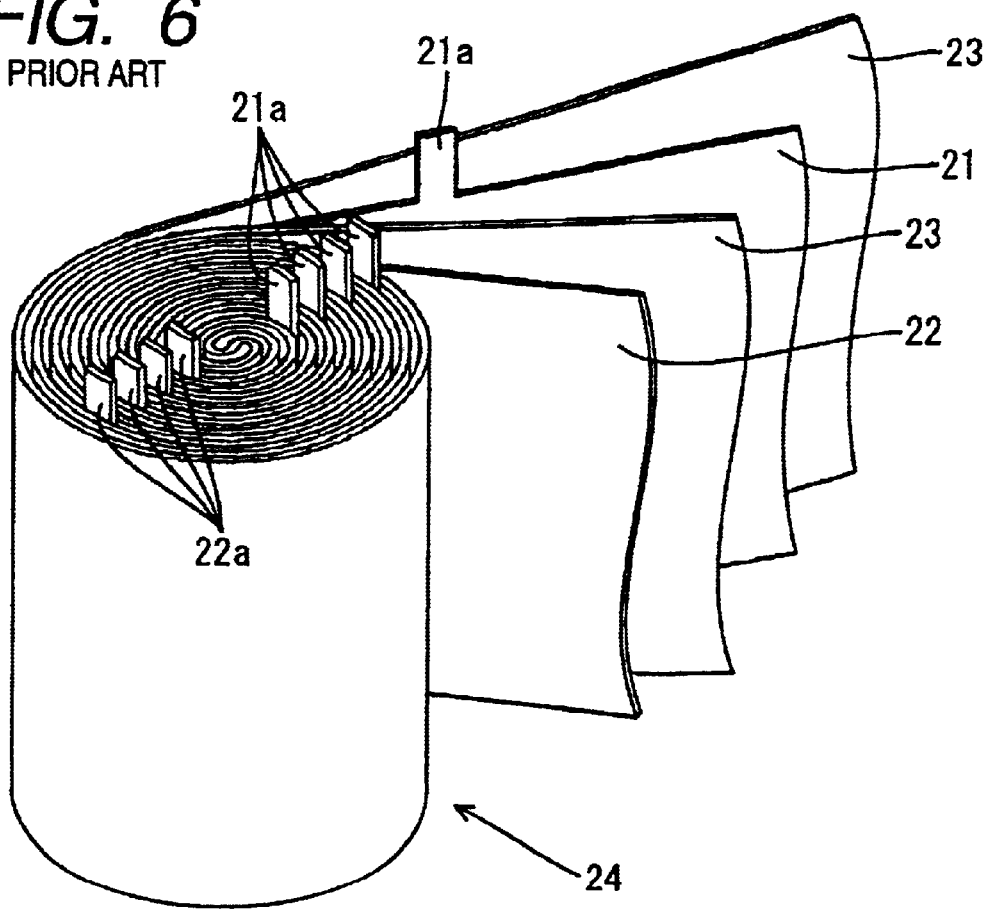
FIG. 6 is a slant view illustrating a conventional electricity-generating element.
Figure 7:
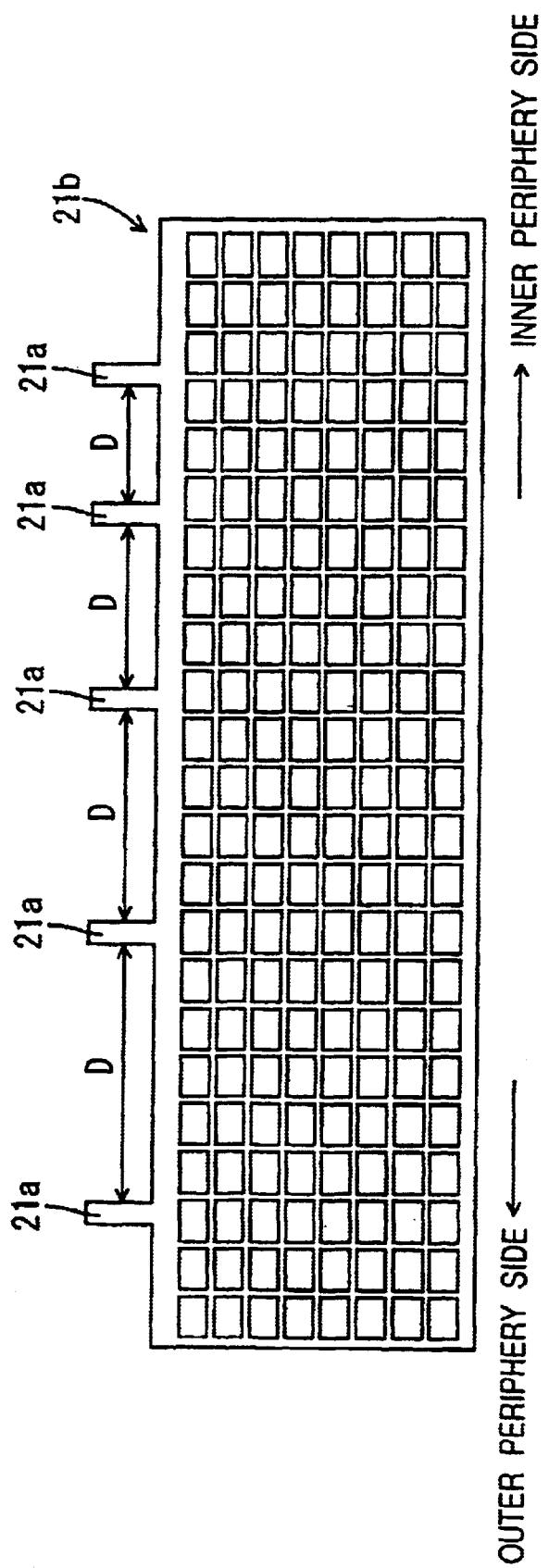
FIG. 7 is a plan view of a grid to be used as the positive electrode of the conventional electricity-generating element.
Figure 8:
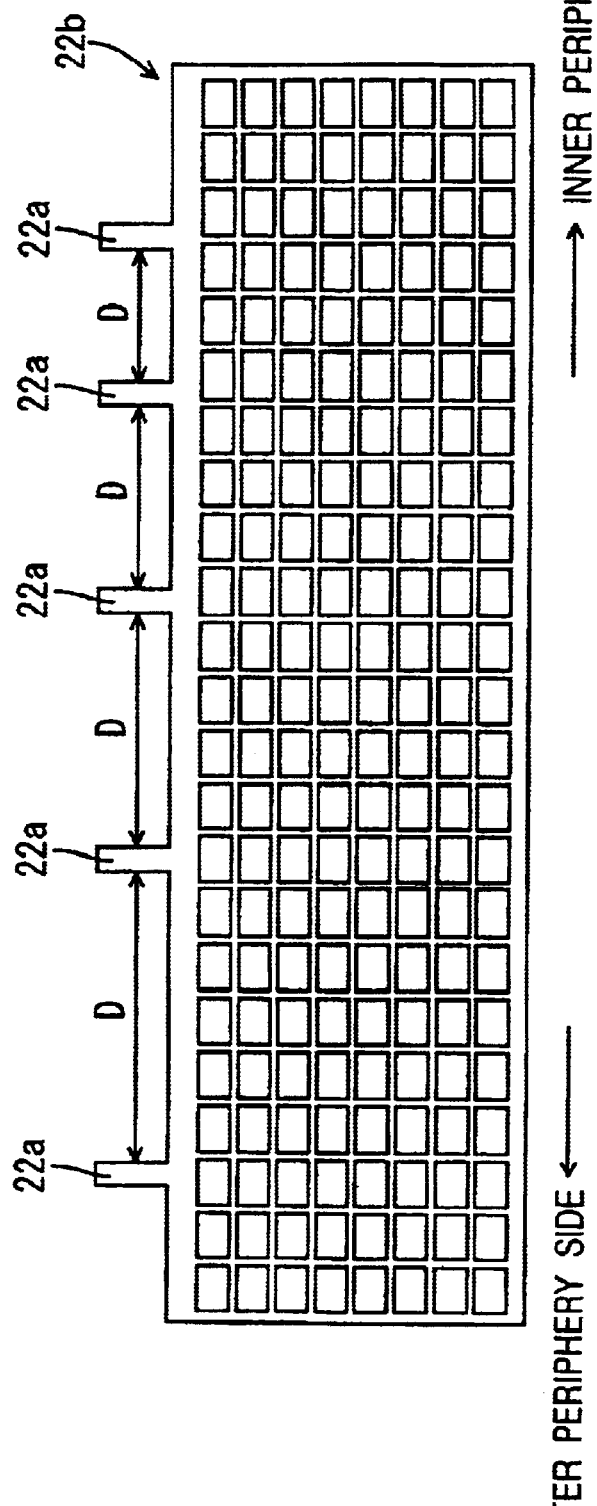
FIG. 8 is a plan view of a grid to be used as the negative electrode of the conventional electricity-generating element.

In addition, in the embodiments described above, the width L of the current collecting lugs 11a and 12a becomes larger toward the outer periphery of the coil. However, the battery of the invention is not limited to this constitution. For example, the current collecting lugs 11a or 12a may include one which has a smaller width than or the same width as the adjacent lug located on the inner side thereof, as shown in FIG. 5.

While the invention has been described in detail and with reference to specific embodiments thereof, it will be apparent to one skilled in the art that various changes and modifications can be made therein without departing from the spirit and scope thereof.

This application is based on Japanese patent application No. 2000-351685 filed Nov. 17, 2000, the entire contents thereof being hereby incorporated by reference.

What is claimed is:

1. A battery comprising an electricity-generating element comprising a strip-form positive electrode, a strip-form negative electrode, and a strip-form separator, said positive electrode and said negative electrode being spirally wound through said separator and said positive electrode and said negative electrode respectively having current collecting lugs protruding from a side thereof, wherein the pitches of the current collecting lugs become longer toward the outer periphery side, and the at least one current collecting lug that located on the outer side has a larger width than that located on the inner side.

2. The battery of claim 1, wherein the current collecting lugs of the positive electrode and the current collecting lugs of the negative electrode are arranged on the same line, respectively.

3. The battery of claim 1, wherein each current collecting lug has a width L approximately satisfying the relationship $L=r \times \theta$, wherein r is the distance between the current collecting lug and the center of winding and $\theta$ is a constant of central angle.

* * * * *